(12) United States Patent
Bugenhagen et al.

(10) Patent No.: US 8,867,737 B2
(45) Date of Patent: Oct. 21, 2014

(54) SYSTEM AND METHOD FOR PROVIDING LINE POWER TO A DIGITAL TELEPHONE

(75) Inventors: Michael K. Bugenhagen, Olathe, KS (US); Greg Wolfe, Springhill, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1871 days.

(21) Appl. No.: 11/588,632

(22) Filed: Oct. 27, 2006

(65) Prior Publication Data

US 2008/0101342 A1 May 1, 2008

(51) Int. Cl.
*H04M 9/00* (2006.01)
*H04M 1/00* (2006.01)
*H04M 19/00* (2006.01)
*H04L 12/10* (2006.01)
*H04M 1/253* (2006.01)

(52) U.S. Cl.
CPC ............. *H04L 12/10* (2013.01); *H04M 19/005* (2013.01); *H04M 1/2535* (2013.01)
USPC .................................................... 379/413.01

(58) Field of Classification Search
USPC ................................ 379/413, 399.01–413.04
See application file for complete search history.

(56) References Cited

U.S. PATENT DOCUMENTS

| | | | | |
|---|---|---|---|---|
| 5,901,205 A | * | 5/1999 | Smith et al. | 379/93.01 |
| 6,272,209 B1 | * | 8/2001 | Bridger et al. | 379/27.01 |
| 6,647,117 B1 | * | 11/2003 | Wallace et al. | 379/413 |
| 6,847,718 B1 | * | 1/2005 | Hiraoka | 379/413 |
| 2004/0213403 A1 | * | 10/2004 | Posthuma | 379/399.01 |
| 2005/0053052 A1 | * | 3/2005 | Ree et al. | 370/352 |
| 2005/0117740 A1 | * | 6/2005 | Rabenko et al. | 379/413 |

\* cited by examiner

*Primary Examiner* — Sonia Gay
(74) *Attorney, Agent, or Firm* — Swanson & Bratschun, L.L.C.

(57) ABSTRACT

A method line powering a remote access device or telephone from a centralized location that includes abstraction of the ancillary signaling functions to that central location. A method of receiving a request for a telephone call includes receiving a digital telephony packet and determining a ring signal in response to the received digital telephony packet. The method also includes generating a voltage signal in response to the determined ring signal and communicating the voltage signal over a twisted pair connection to a digital telephone. The communicated voltage signal is operable to power the digital telephone and generate a ring signal at the digital telephone. The digital telephone is operable to generate digital telephony packets representative of voice data.

13 Claims, 3 Drawing Sheets

SYSTEM AND METHOD FOR PROVIDING LINE POWER TO A DIGITAL TELEPHONE

BACKGROUND

The lack of federal regulation and the decreased cost to both consumers and service providers has lead to a rise in the popularity of digital telephones that enable callers to conduct telephone calls connected over a digital network such as the Internet. Such digital telephones utilize digital telephony packets containing both the signaling information and actual voice data necessary to establish and conduct a telephone call. The most popular protocol for conducting such telephone calls over a network such as the Internet is the Voice over IP protocol (VoIP). Federal regulations do not consider the communication of VoIP telephony packets to be regulated as ordinary telephone services, provided that any voice communications are embedded in digital packets, as opposed to analog signals, at the point at which such voice communications leave a residence or customer premises using a network interface such as a user network interface (UNI). In such a manner, telephone calls conducted using the plain old telephone system (POTS) are subject to regulation by the federal government because of the use of an analog signal communicated over a twisted pair connection that carries voice traffic away from a residence or customer premises. Digital telephony protocols such as VoIP convert an analog signal from a handset or other client device into a digital packet, therefore providing that all voice communications leave a residence or customer premises in packetized form.

Traditional analog telephones that communicate voice traffic over a POTS network do so via a twisted pair, which is typically composed of two copper wires. Notably, telephones utilizing such twisted pair connections that do not include additional functionality such as an answering machine may not need an additional external power supply such as a battery or connection to a typical A/C power outlet. Instead, the functionality provided by such a POTS telephone set can be powered directly over the twisted pair connection via a talk battery and ringing signaling. In such a manner, a remote power supply located at a telephone company's facility, such as a central office or switching station, may be utilized to power telephones in remote residences and office buildings. Such telephones are typically referred to as being "line powered."

One benefit to such telephones being line powered is less of a susceptibility to power outages that may be caused by an interruption in a power grid, natural disaster, or other power outage. While the power supply at the telephone company's central office or switching facility may also be susceptible to sources of power outages, such facilities may have greater protection from such power outages due to location, backup or emergency power sources, connection to a more centralized portion of a power grid, redundant connections to a power grid, or other enhanced ability to avoid power outages which may affect ordinary residences or businesses.

Another benefit of the invention is the improved economics of consolidating the costly ancillary signaling functions into a single location capable of serving multiple users. This reduces the cost of the user network device, and generally improves the cost per customer service impacts associated with service churn.

One disadvantage of digital telephones utilized, for example, to provide VoIP services is that they typically require a local power source such as an A/C wall outlet and are not "line powered" using a twisted pair or other connection. Such local power supply makes them more susceptible to power outages. Such telephones are typically equipped with an additional battery to allow the telephone to continue to function during short power outages wherein power from an A/C outlet may be unavailable.

SUMMARY

Various embodiments of the present invention may provide one or more advantages over prior telephone systems.

In one embodiment of the present invention, a method of receiving a request for a telephone call is disclosed that includes receiving a digital telephony packet and determining a ring signal in response to the received digital telephony packet. The method also includes generating a voltage signal in response to the determined ring signal and communicating the voltage signal over a twisted pair connection to a network interface such as a UNI or IAD, or to a digital telephone). The communicated voltage signal is operable to power the digital telephone and generate a ring signal at the digital telephone. The digital telephone is operable to generate digital telephony packets representative of voice data.

In another embodiment of the present invention, a digital telephone is disclosed that includes a device operable to convert sound into an analog signal and a network interface in communication with the device and operable to convert the analog signal into a digital signal. The device and the network interface are both powered by an analog voltage provided over a twisted pair connection.

In yet another embodiment of the present invention, a gateway for a digital telephone is disclosed that is in communication with a digital telephone over a twisted pair connection. The gateway is operable to receive digital telephone packets from the digital phone. The gateway is further operable to provide the digital telephone with an analog voltage signal over the twisted pair connection, the analog voltage signal being operable to power the digital telephone.

DETAILED DESCRIPTION OF THE DRAWINGS

In one embodiment of the present invention, the functional grouping of a digital Internet protocol telephone set or integrated access device (IAD) is divided into two functional groups. One group contains the analog to digital (A/D) conversion and echo cancellation (EC) functions and a modified IP telephony protocol stack to generate control signaling. The other group contains the ancillary signaling functions for tone detection, tone Generation, signaling generation (such as a ring signal), and a talk battery.

In another embodiment of the present invention, the first group A/D and EC functions are integrated into a user network device such as a user network interface (UNI). This group of functions can be line powered rather than requiring external power at the UNI. The second group of functions described above is placed in a common location and perform the ancillary signaling functions for one or more users.

In yet another embodiment of the present invention, the centralized ancillary signaling function also contains a protocol stack function that sniffs, proxies, or simply monitors the IP control signaling path of the UNI devices that it supports. This protocol stack reacts to signaling to generate ancillary signaling for the UNI devices.

FIGS. 1-4 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
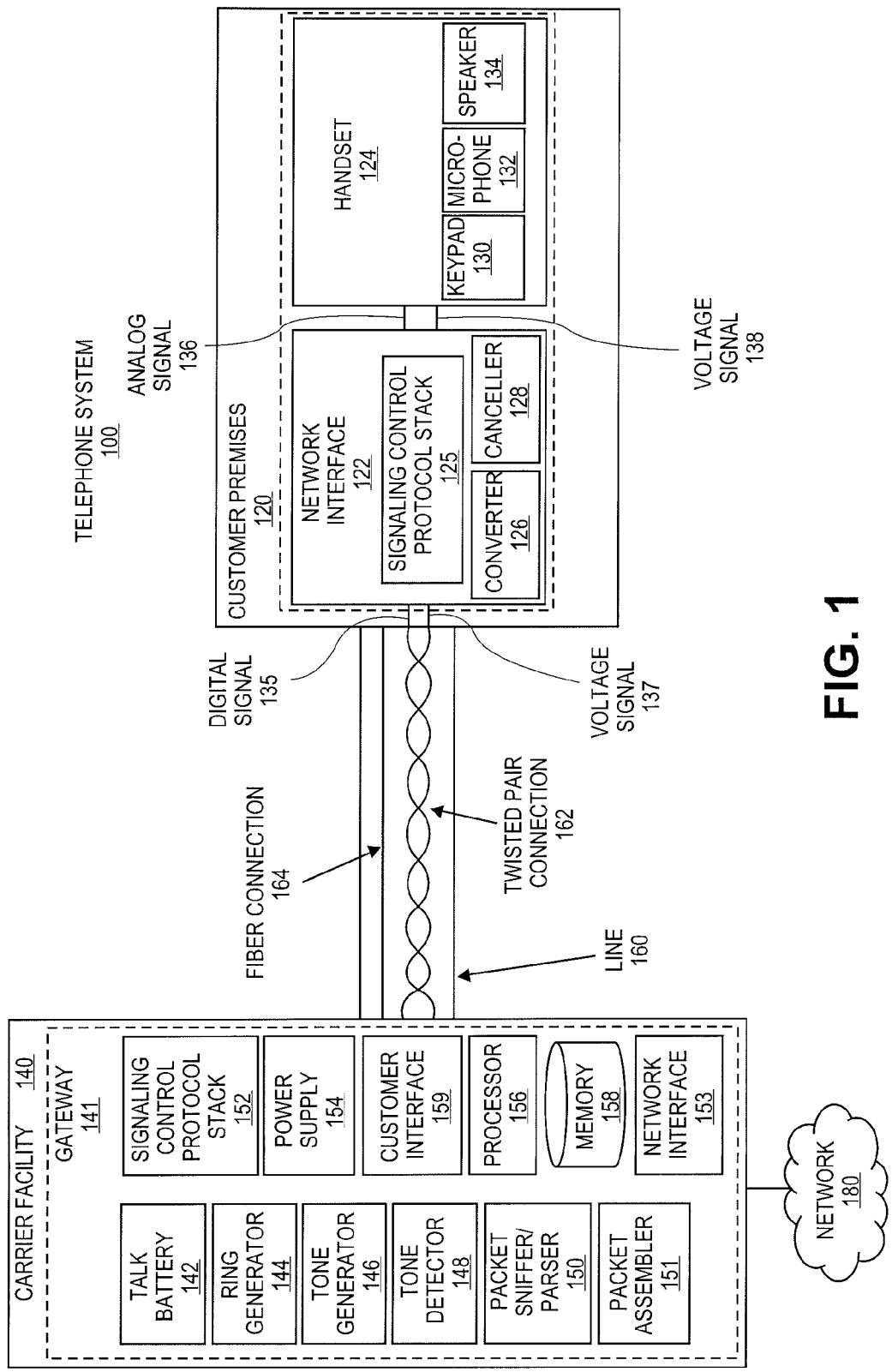
FIG. 1 illustrates one embodiment of a telephone system 100 implemented according to the teachings of the present invention.

FIG. 1 illustrates one embodiment of a telephone system 100 implemented according to the teachings of the present invention. Telephone system 100 includes a customer premises 120 and a carrier facility 140 in communication with each other over a line 160. Carrier facility 140 is in further communication with a network 180.

Customer premises 120 includes a network interface 122 and a handset 124. Handset 124 may communicate with network interface 122 via an analog signal 136. Network interface 122 may communicate with line 160 via a digital signal 135. Although illustrated as separate components, network interface 122 and handset 124 may be a single integrated device such as a digital telephone, personal computer, or similar device. Similarly, although certain components are illustrated as being within network interface 122 and other components are illustrated as being within handset 124, all of such components may be in a single device, or may be distributed among two devices in a manner other than illustrated in FIG. 1.

In one embodiment, network interface 122 is an Integrated Access Device (IAD) utilized to integrate access to a network such as the Internet. For example, an IAD may be utilized to allow voice, data, and video communications over a network such as the Internet. In alternative embodiments, network interface 122 may be a digital subscriber line (DSL) modem, multi-media terminal adapter, analog telephone adapter gateway, or any other suitable network interface allowing the communication of digitally encoded data over line 160.

Network interface 122 includes a converter 126 and a canceller 128. Converter 126 is an analog to digital converter capable of converting analog signals representative of voice communications into digital packets, and converting digital packets into analog signals for voice communications. Digital signal where used herein is synonymous with the communication of one or more digital packets. Canceller 128 is an echo canceller or the equivalent thereof suitable for regulating the quality of voice communications by eliminating redundant voice data and otherwise filtering or improving the quality of any voice data received. In certain embodiments, converter 126 may not include canceller 128. Network interface 122 may also contain a signaling control protocol stack 125. Stack 125 responds to user actions on the handset such as hook switch activity, and can be used alone or in combination with other devices or components to perform caller ID functionality, the presentation of a caller name, or other calling signaling or message waiting user signaling functions. Network interface may detect off-hook on-hook, and user dialing or key push activities. Network interface may also generate operational line state queries for on/off hook Handset 124 includes a keypad 130, a microphone 132, and a speaker 134. Keypad 130 may be any suitable keypad, keyboard, touch screen, graphical user interface or other suitable data entry device that allows a user of handset 124 to enter a telephone number, name, IP address, or other indication of how to communicate a telephone call. In yet another embodiment, keypad 130 may not exist as a separate functional element, but may instead be embodied functionally by an alternative user interface such as voice activated dialing or an additional device such as a personal computer. Microphone 132 may be any suitable means of capturing voice communications. Speaker 134 may be any suitable means for generating voice or other audio communications.

Either network interface 122, handset 124, or both network interface 122 and handset 124 may not be embodied in a traditional telephone handset. They may be instead embodied in any device such as a personal computer, PDA, MP3 player, or other suitable device.

In one embodiment, carrier facility 140 is a central office or switching station of a telephone company. Alternatively, carrier facility 140 may be a network operations center, digital loop carrier, office of a competitive local exchange carrier, or any other suitable physical location for maintaining centralized telecommunications equipment.

Carrier facility 140 includes a gateway 141. In one embodiment, gateway 141 is a multiplexer such as a digital subscriber line access multiplier (DSLAM). However, gateway 141 may be a switch, router, bridge, hub, cable management system, other suitable gateway or access point, or any other network node or device suitable for providing access to a network such as the Internet or a public switched telephone network.

Gateway 141 may include several functional elements as described in further detail below. Such functional elements may be embodied by a single general purpose processor 156 and a memory 158, or may alternatively be provided by one or more special purpose processors, memory components, application specific integrated circuits, or any other suitable devices capable of performing the functionality described below. Processor 156 and memory 158 are representative of any suitable processing and memory component or components that may be utilized to provide the functionality of gateway 141. Certain elements of gateway 141 described below may be omitted in certain cases.

Gateway 141 includes a talk battery 142, a ring generator 144, a tone generator 146, a tone detector 148, a packet sniffer/parser 150, a packet assembler 151, a signaling control protocol stack 152, a power supply 154, a network interface 153, and a customer interface 159. The term sound generator is used in this application to refer to either a ring generator, a tone generator, or a generator functioning as both a ring generator and a tone generator.

Talk battery 142 provides a power supply to power network interface 122 and handset 124 over line 160 using voltage signals 137 and 138, or a single voltage signal 137 if network interface 122 and handset 124 are a single integrated device. Ring generator 144 generates a voltage signal that causes handset 124 to ring, indicative of an incoming call Tone generator 146 generates a voltage signal that causes audio tones to be generated at handset 124 to, for example, access an answering machine or other peripheral device or functionality located at customer premises 120. Tone detector 148 detects the selection of entries made via keypad 130 of handset 124.

Packet sniffer/parser 150 interrogates incoming digital packets received over network 180 to determine when it is necessary to provide functionality via ring generator 144 or tone generator 146. In such a manner, digital data indicative of an incoming call or the selection of a keypad input of a remote user's telephone may be converted into an analog voltage signal generated by ring generator 144 or tone generator 146. Through the specification and claims, packet sniffer/parser 150 may be referred to collectively as packet sniffer to denote both the copying of data included in digital packets and the identification of portions of such copied data, or may be referred to as the separate components packet sniffer and parser.

Signaling control protocol stack 152 is a proxy for a signaling protocol such as Session Initiation Protocol (SIP), Media Gateway Control Protocol (MGCP), H.248, H.323, or any other suitable protocol capable of conducting the signaling necessary to set up and conduct a telephone call over a digital network such as the Internet. Control packets may be sent to and from gateway 141 and utilize signaling control protocol stack 152 to request and receive calls. Gateway 141 may use signaling control protocol stack 152 to communicate with other similar gateways to set up distant call connections.

Packet sniffer/parser 150 and signaling control protocol stack 152 work together to detect voltage specific functions within digital telephony packets such as ring generation and tone generation to allow gateway 141 to generate analog voltages to accomplish such functions and further to allow gateway 141 to communicate the remainder of the digital telephony packet representative of voice communications over line 160 to customer premises 120 for delivery to handset 124. Although described above relative to communicating the "remainder of" a digital telephony packet, it should be understood that the entire digital telephony packet may be communicated over line 160 after voltage specific functions are identified such that network interface 122 receives the entire digital telephony packet instead of a partial packet or packet implemented using another format.

Packet assembler 151 creates digital telephony packets according to a particular protocol such as a VoIP protocol from digital packets received over line 160 and other data such as the detection of a tone or other user input communicated using an analog voltage over line 160 and detected by tone detector 148. For example, packet assembler 151 may construct a header of a voiceover IP packet wherein the header includes a destination IP address determined in response to a series of tones detected by a tone detector 148. Such series of tones may, for example, be a telephone number. In such a manner, packet assembler 151 may obtain header information sufficient to route and communicate voice traffic and payload information containing that voice traffic in order to construct a complete VoIP packet. Alternatively, packet assembler 151 may receive VoIP packets from network interface 122 over line 160 and may only add or substitute information to or in the header of the VoIP packet or other digital telephony packet.

In one embodiment, gateway 141 may not include tone detector 148. Instead, network interface 122 may convert analog audio signals and control information such as dialed digits or tones into a packet such as a VoIP or other digital telephony packet. In such a manner, packet assembler may be unnecessary as gateway 141 may receive a complete and sufficient digital telephony packet over line 160.

Network interface 153 is a physical interface to network 180 over which digital telephony packets are received by gateway 141. In such a manner, packet sniffer/parser 150 may interrogate each incoming packet received at network interface 153 to determine any voltage or signaling specific functions. Similarly, customer interface 159 is a physical interface to line 160 and receives digital telephony packets from customer premises 120 over line 160.

Power supply 154 provides analog voltage signals to be communicated over line 160. Although talk battery 142, ring generator 144, and tone generator 146 are previously described as providing an analog voltage signal over line 160, in fact such functional components may only regulate and control power supply 154 to provide an analog voltage signal over line 160. Although illustrated as a single power supply 154, it should be understood that power supply 154 may be distributed among more than one power supply, or may be integrated within separate devices providing the functionality of talk battery 142, ring generator 144, tone generator 146 or other functional components of gateway 141, such that each of such separate components have their own power supply or share of power supplies in any suitable combination. Power supply 154 may provide a continuous voltage signal to power network interface 122 and/or handset 124 and may selectively supply an additional level or change in the level of voltage supply to perform the functions of ring generator 144 or tone generator 146.

In one embodiment, line 160 is a twisted pair connection 162. Twisted pair connection 162 may be a twisted copper pair, or any other suitable network connection capable of both providing voltage and communicating data. Line 160 may be more than one connection such that one connection provides a voltage signal and another connection is capable of communicating data. In one embodiment, as illustrated in FIG. 1, line 160 may include twisted pair connection 162 and a fiber connection 164. In such an embodiment, twisted pair connection 162 may be utilized to provide voltage signals to power network interface 122 and/or handset 124 as well as certain functionality thereof, while fiber connection 164 may be utilized to communicate data. In another embodiment, fiber connection 164 is utilized to communicate any data other than digital telephony packet data, while twisted pair connection 162 communicates digital telephony packet data over a DSL connection. In yet another embodiment, two twisted pair connections can be utilized within line 160, one providing voltage signaling and the other providing data communication while operating, for example, as a digital subscriber line.

In one embodiment, network 180 is the Internet. However, network 180 may be any suitable data or voice network capable of communicating telephone calls between carrier facility 140 and another facility, customer premises, or residence. For example, network 180 may be a public telephone network. In such an example, gateway 141 may need to convert an incoming telephone call from the protocols of the public telephone network into a digital telephony packet protocol such as VoIP. In another embodiment, network 180 could be both a PSTN and an IP network overlay that are merged together to offer any combination of the services.

Figure 2:
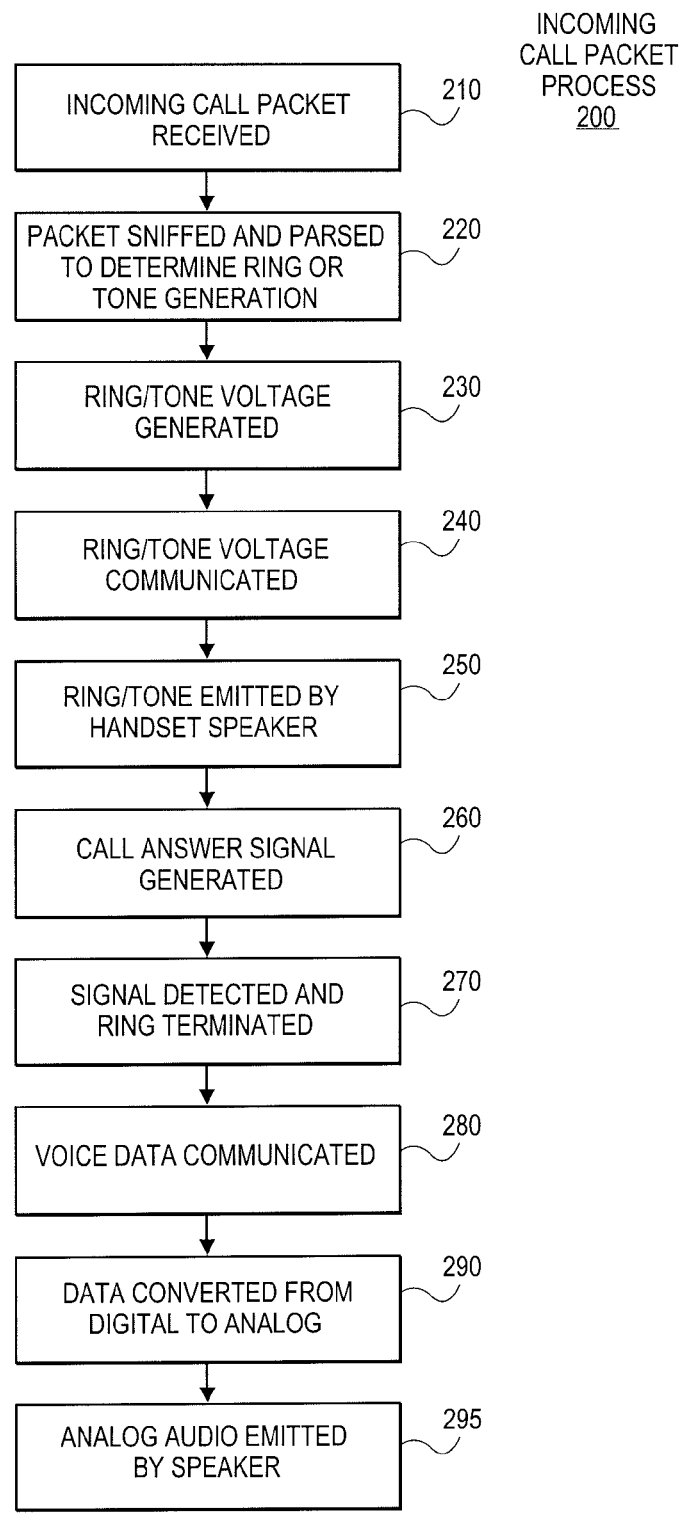
FIG. 2 illustrates one embodiment of a process for handling incoming call packets from a network.

FIG. 2 illustrates one embodiment of a process for handling incoming call packets from a network. In Step 210, an incoming call packet is received. In Step 220, the packet is sniffed and parsed to determine if any ring or other signaling generation needs to be accomplished. In Step 230, a voltage is generated to create such ring or tone generation. In Step 240, such voltage is communicated from a carrier facility over a line to a customer premises. In Step 250, at the customer premises, the desired ring or tone is generated at a telephone in response to receiving the voltage from the carrier facility. In Step 260, the caller picks up the handset and either network interface 122, or handset 124 generates a "call answered" signal. In Step 270 the packet sniffer/parser detects the "call answered" signal and stops generating ringing tone on the line. In Step 280 the remainder or the entire incoming call packet is communicated from the carrier facility over the line to the customer premises. In Step 290, at a network interface located at the customer premises, which may be integral to a telephone itself, the incoming call packet is converted from a digital format to an analog format. In Step 295, audio is emitted by a speaker of the telephone in response to the analog data.

Figure 3:
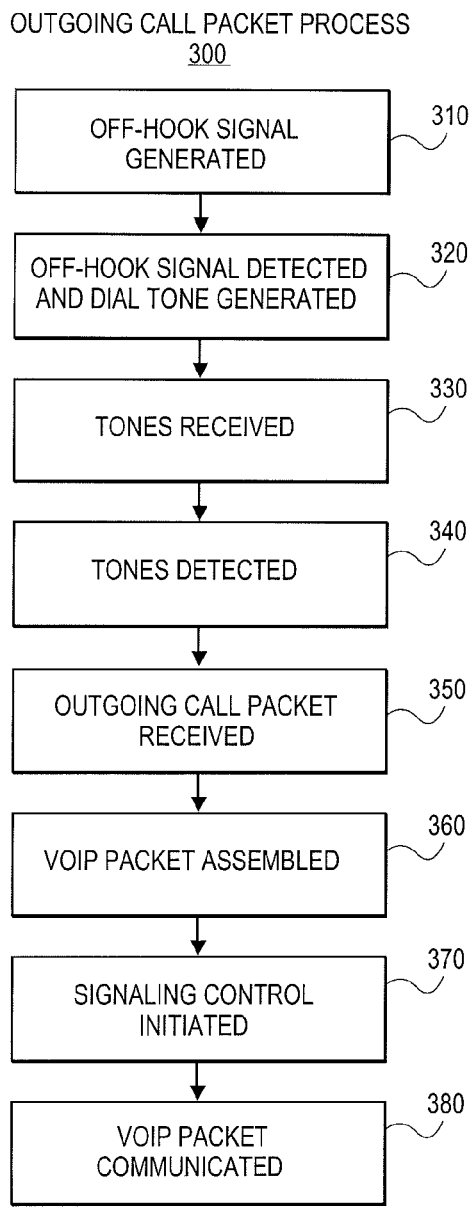
FIG. 3 illustrated one embodiment of a process for communicating outgoing call packets.

FIG. 3 illustrates one embodiment of a process for communicating outgoing call packets. In Step 310, the user lifts their handset which generates a signal into protocol stack in a network interface or handset. In turn, the protocol stack generates a "off-hook" signal which is sent to a carrier facility. In Step 320, the packet sniffer/parser detects the off-hook signal and internally communicates with a tone generator to apply a dial tone to a line, which is then transmitted through a network interface 122 to a user handset. In Step 330, the user dials a phone number, and the tones are interpreted by a tone detector in Step 340. A specific tone is detected and determined. One or more tones may be detected, stored in memory, and used in combination to determine a destination of a telephone call such as a telephone number, network address, recipient name, or other indicia of a destination. Such telephone number of other indicia can then be utilized to establish a telephone call with a desired remote location.

In Step 350, an outgoing call packet is received including digital data representative of voice communications. In Step 360, a digital telephony packet is assembled. Such digital telephony packet may include addressing information determined, for example, from tones detected in Step 340, and other suitable information necessary to initiate a telephone call and/or route communications to the appropriate remote destination. The digital telephony packet may also include payload data such as voice data to be communicated to the remote location.

In Step 370, signaling control is initiated to set up a communication session between two network addresses to allow for the telephone call. For example, in a VoIP protocol, two communication sessions may be established, one from caller A to recipient B, and the other back from recipient B to caller A. In such a manner, voice traffic from caller A may be communicated in one communication session to recipient B, while voice traffic from recipient B back to caller A may be communicated using a separate second communication session. In Step 380, once the communication sessions are established, the digital telephony packet containing the voice communications is communicated over a network.

Figure 4:
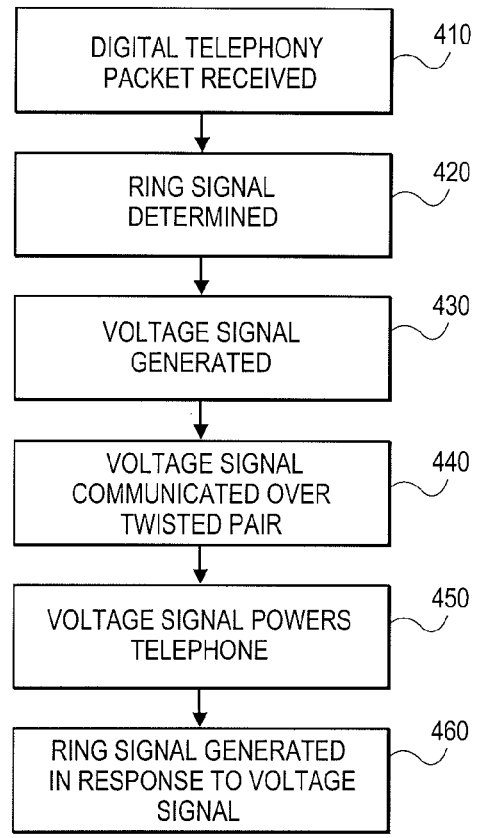
FIG. 4 illustrates one embodiment of a process of generating a ringing signal.

FIG. 4 illustrates one embodiment of a process of generating a ringing signal. In Step 410, a digital telephony packet is received. In Step 420, a ring signal is determined in response to receiving the digital telephony packet. In Step 430, a voltage signal is generated in response to determining a ring signal. In Step 440, the voltage signal is communicated over a twisted pair connection from a carrier facility to a digital telephone located at a customer premises. In Step 450, the voltage signal provides power to the digital telephone. In Step 460, the digital telephone generates a ring signal in response to receiving the voltage signal.

Although particular embodiments of the present invention have been explained in detail, it should be understood that various changes, substitutions, and alterations can be made to such embodiments without departing from the spirit and scope of the present invention as defined solely by the following claims.

What is claimed:

1. An apparatus, comprising:
   a digital telephone handset comprising:
   a device operable to convert sound into a first analog signal; and
   a network interface in communication with the device and operable to convert the first analog signal into digital telephony packets, receive digital telephony packets from a network, convert the digital telephony packets received from the network into a second analog signal, and communicate the second analog signal to the device, the network interface further comprising a signaling control protocol stack that responds to hook switch activity and to user actions on the digital telephone handset;
   wherein the device and the network interface are both powered only by a continuous analog voltage provided over a twisted pair connection, and wherein the device is operable to generate a ring in response to changes in the analog voltage provided over the twisted pair connection.

2. The apparatus of claim 1, wherein the network interface further includes a canceler, the canceler operable to improve the quality of the second analog signal.

3. The apparatus of claim 1, wherein the network interface is further operable to generate digital packetized call signals from analog signals received in response to user actions on a POTS telephone or an IP telephone.

4. The apparatus of claim 1, wherein the device includes a microphone, the microphone operable to receive sound, the microphone powered by the analog voltage provided over the twisted pair connection.

5. The apparatus of claim 1, wherein the device includes a speaker, the speaker operable to generate sound in response to an analog signal received from a converter, the speaker and the converter powered by the analog voltage provided over the twisted pair connection.

6. The apparatus of claim 1, wherein the network interface includes a fiber interface operable to communicate data over optical fiber.

7. The apparatus of claim 1, wherein the network interface includes a fiber interface operable to communicate data over a second twisted copper pair.

8. The apparatus of claim 1, wherein the device includes a speaker operable to generate a tone in response to receiving the analog voltage.

9. The apparatus of claim 1, wherein the digital telephone handset includes a packet sniffer, the packet sniffer operable to determine if a digital packet includes data indicative of a need to provide an analog voltage signal.

10. A method of receiving a request for a telephone call, the method comprising:
    receiving a digital telephony packet at a location external to a customer premises;
    determining a ring signal in response to the received digital telephony packet;
    generating a voltage signal;
    communicating the voltage signal over a twisted pair connection to a digital telephone handset at the customer premises, the communicated voltage signal operable to power the digital telephone handset and generate a ring signal at the digital telephone handset, the digital telephone handset comprising a signaling control protocol stack that responds to hook switch activity and to user actions on the digital telephone handset; and
    generating control signals to set up and conduct a telephone call involving the digital telephone handset over a digital network using the signaling control protocol stack.

11. The method of claim 10, and further comprising communicating voice data to the digital telephone handset.

12. The method of claim 10, and further comprising communicating voice data to the digital telephone handset over the twisted pair.

13. The method of claim 10, and further comprising communicating voice data to the digital telephone handset over optical fiber.

* * * * *